Patented July 13, 1937

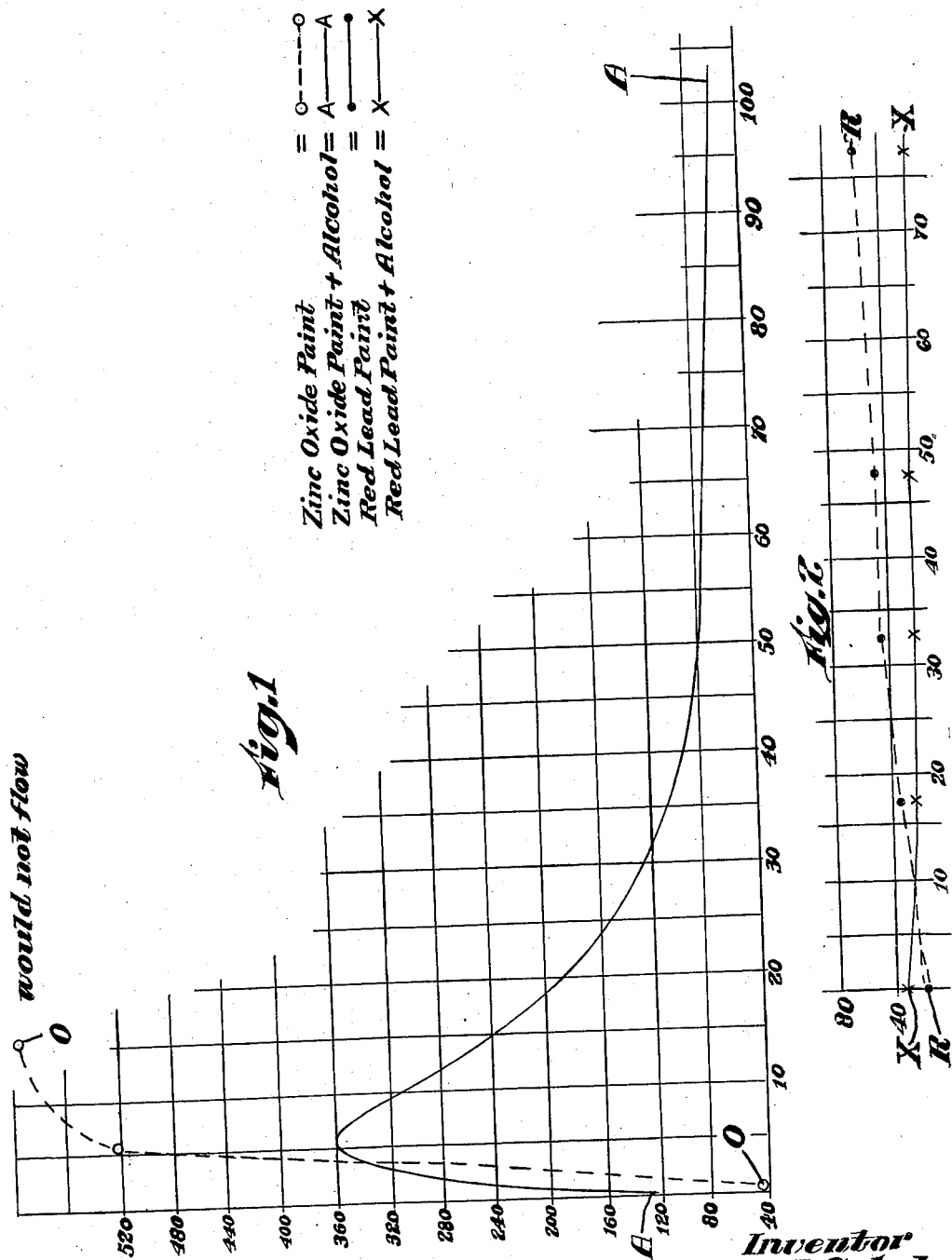

2,087,197

UNITED STATES PATENT OFFICE 2,087,197

PROCESS OF REDUCING VISCOSITY IN CERTAIN PAINT OR LIKE SYSTEMS AND PRODUCTS ACCORDING TO THE SAME

Samuel Cabot, Jamaica Plain, Mass., assignor to Samuel Cabot, Inc., Boston, Mass., a corporation of Massachusetts Application October 8, 1934, Serial No. 747,378

12 Claims. (Cl. 134—39)

In the manufacture of certain paints, enamels, stains or like systems, it is frequently necessary or desirable to use drying or semi-drying oils or resins that contain free fatty and/or resin acids with pigments which are basic or with which they tend to react.

These reactions have resulted in many difficulties in the past. The resultant soaps or other organophile colloids greatly increase the viscosity or body of the paint or like product causing effects which are sometimes referred to in the paint trade as "puddling" or "livering". Among the pigments subject to such reactive effects in production are zinc oxide, red lead, umbres, ochres, siennas and certain synthetic pigments of a like nature which otherwise are desirable color ingredients for paint production.

My present invention contemplates the anticipation and/or elimination of these undesirable or otherwise unpreventable increases in viscosity. This I am able to do without generally or strongly reacting on the other ingredients in the paint, enamel or other product being produced. The anticipation or prevention of the slow forming reaction products makes it possible safely to broaden their use and improve the quality and workability of the product. My invention also contemplates making innoxious the undesired reaction products if they have been or should be unexpectedly formed and that too without any deleterious effects on the rest of the paint or like product contemplated by my invention.

As illustrative of my invention I will disclose and discuss characteristic products and treatments employed, with my brief observations thereon, although any such observations or suggestions of theory are not to be taken as limiting and are merely offered to assist others to obtain the maximum advantages of my process and provide the products in the various forms and for the different uses desired.

I have found that the increase in viscosity involved in the products which show these defects may be eliminated by the addition of small amounts of polar compounds. These I have found to be available in forms not generally or strongly reactive under ordinary conditions with the usual ingredients desired for use in compounding the paint or like product, nor otherwise affecting the original or desired consistency of the product. Furthermore, such compounds must be of a nature to be effective to peptize or decrease the viscosity of the soaps or other colloid dispersions involved or to render them innoxious if accidentally generated, but to do so without using an amount which would prove a factor in the fluidity or other character of the paint.

Such a compound may be an organic hydroxyl compound and preferably a lower aliphatic alcohol such as ethyl or methyl alcohol. Other hydroxyl compounds are available in the higher alcohols or phenols, but the simpler alcohols seem to act more quickly and are more volatile and are satisfactory for general reasons. Such alcohols or other polar compounds may for speeding up the reaction be used with a paint or like product that has been preheated, or the polar compound may be added and heat applied to accelerate the final result. The lower alcohols above indicated as preferable are of low dipole moment and substantially insoluble in the mixture. Without limitation to such a theory I would point out that in the so-called peptization of the soap the alcohol probably forms as an oriented polar layer between the heavy metal soaps and the other organic ingredients or between the basic pigments and the fatty and/or resin acids of the mixture after the initial rise in its viscosity has taken place. Regardless of exact theory, such polar alcohols when so added ultimately reduce the initial high viscosity resultant from the saponification due to the reaction as above discussed and render it free from livering tendencies and accomplish this result without appreciable thinning or dilution of the system.

The various paints, enamels and like products to which my process is advantageously applied may vary considerably. As a convenience for reference and as a basis of discussion I have taken as illustrative a pair of characteristic graphs which I have indicated as Figs. 1 and 2 on the accompanying illustrative sheet.

The graph of Fig. 1 shows a comparison of the curves based on the rise in viscosity during a certain length of time of a zinc oxide paint plotted on the dotted line O—O and such a paint with the small amount of alcohol in accordance with my invention as indicated by the solid line A—A of the graph.

I have indicated for these graphs as a convenient chart basis one ruled to indicate suitable degrees of viscosity in vertical rise and in convenient units of elapsed time in horizontal disposition. The vertically arranged numerals running from 40 to 520 indicate the length of time in seconds that it takes for a known amount of my product to flow through an opening of known size. The horizontally arranged numerals running from 10 to 100 indicate days.

It will be seen that the line O—O of the zinc oxide paint indicated shows a very rapid rise and soon loses fluidity, while the line A—A of the zinc oxide paint with the small amount of the polar alcohol shows a rapid rise in viscosity to a peak, but then falls rapidly to a low permanent level.

In the graph of Fig. 2 the dotted line R—R shows the continuous increase in viscosity of a red lead paint while the solid line X—X shows the prompt establishment of a permanent low viscosity in the same material to which a small amount of alcohol has been added.

When considered on the basis of characteristic graphs in which one dimension is time and the other the degree of viscosity as charted as before described, I have shown that if heat is applied the peak of the curve is advanced in time. Also, it will be found that if the curve be plotted for a product manufactured in accordance with my invention or improved under my treatment where the alcohol is not added until later, the viscosity peak would be indicated as abrupt and the graph line then becomes horizontal until the time my polar compound is supplied at which time the graph line drops abruptly.

As examples of my invention I submit the following. To a coating composition consisting of

| | Parts |
|---|---|
| (White Seal) zinc oxide | 43 |
| Heat polymerized linseed oil having an acid value above 10 | 15 |
| Boiled linseed oil of acid value about 3 | 4 |
| Mineral naphtha | 18 |
| Drier | 1 |

I add 0.8% by weight of methyl alcohol based on the total weight of the composition. The immediate effect, if the enamel is freshly made, is to increase the viscosity markedly at once. After a period of two to five days the viscosity will usually reach its maximum and will from then on reduce until after perhaps two weeks it will usually be lower than when the material was freshly made up. It will then maintain its viscosity unchanged. If the enamel is old and has already become highly viscous when the alcohol is added, the reduction in viscosity by the addition will be immediate.

In another example, to

| | Parts |
|---|---|
| Red lead | 1144 |
| Polymerized mixture of soya bean and China-wood oil | 284 |
| Mineral naphtha | 200 |

I add (½ of 1%) 14 parts by weight of ethyl alcohol based on the total weight of the composition.

My novel products so produced and/or treated with polar compounds as described above have certain advantages over identical materials not so treated.

(1) They will have from two to twenty times the fluidity; (2) the viscosity will be less subject to change with changes of temperature; and (3) the tendency of the material (while in a can exposed to the air) to skin over will be much reduced.

There are variations in the methods of producing the results desired. The paint, enamel, stain or the like may be heated with the polar compound or before introducing the polar compound to hasten the ultimate result as above suggested. The term "fatty or resin acid" as used herein is used to include those organic acids which are soluble in hydrocarbon solvents and are capable of forming soaps of heavy metals colloidally dispersible in hydrocarbons. These acids will include many fatty, napthenic or aromatic carboxylic acids and certain resin acids and some polymers of all the above or mixtures of the same.

By the term "basic pigment" is meant a pigment or mineral substance which is reactive with such fatty or resinous acids to form sufficient quantities of soaps or other organophile colloids to greatly increase the viscosity or body of the paint, stain, enamel, or like system.

What I therefore claim and desire to secure by Letters Patent is:—

1. A method of producing a pigmented coating composition, including a step which consists in mixing a basic pigment with an oil or resinous vehicle of a class consisting of drying glyceride type oils, semi-drying glyceride type oils, and natural resins, said vehicle containing in addition to its esters free soap-forming acids normally reactive with the basic pigment and in an amount sufficient to form heavy metal soaps producing substantial increase in the viscosity of the mixture, and a step which consists in hastening the initial rise in the viscosity of the mixture by adding an alcohol of low dipole moment and substantially insoluble in the mixture and in an amount sufficient to peptize the soap after initial rise in the viscosity of the mixture, whereby ultimately to reduce its inherent high viscosity and livering tendency without appreciable dilution of the composition.

2. The method of claim 1, the alcohol being a primary monohydric alcohol.

3. The method of claim 1, the alcohol being present in an amount not over 5% by weight of the mixture.

4. The method of claim 1, the alcohol being present in an amount approximately 0.8% by weight of the mixture.

5. The method of claim 1, the alcohol being present in an amount approximately one-half of 1% by weight of the mixture.

6. A method of producing a pigmented coating composition, including a step which consists in mixing a basic pigment with an oil or resinous vehicle of a class consisting of drying glyceride type oils, semi-drying glyceride type oils, and natural resins, said vehicle containing in addition to its esters free soap-forming acids normally reactive with the basic pigment and in an amount to form sufficient heavy metal soaps to cause substantial increase in the viscosity of the mixture, a step which consists in heating the mixture to accelerate the saponification, and a step which consists in hastening the initial rise in the viscosity of the mixture by adding a polar alcohol in an amount sufficient to peptize the soap after initial rise in the viscosity of the mixture, whereby ultimately to reduce its inherent high viscosity and to eliminate livering tendency without appreciable dilution of the composition.

7. A method of producing a pigmented coating composition, including a step which consists in mixing a basic pigment with an oil or resinous vehicle of a class consisting of drying glyceride type oils, semi-drying glyceride type oils, and natural resins, said vehicle containing in addition to its esters free soap-forming acids normally reactive with the basic pigment and in an amount to form sufficient heavy metal soaps to cause substantial increase in the viscosity of the mixture, a step which consists in hastening the initial rise in the viscosity of the mixture by adding a polar alcohol in an amount sufficient to peptize the soap after initial rise in the viscosity of the mixture whereby ultimately to reduce its inherent high viscosity and to eliminate livering tendency without appreciable dilution of the composition, and a step which consists in heating the resultant compound to accelerate the saponification.

8. As a new product, a pigmented coating composition, comprising a mixture of materials including a basic pigment, an oil or resinous vehicle of a class consisting of drying glyceride type oils, semi-drying glyceride type oils, and natural resins, said vehicle containing in addition to its esters free soap-forming acids normally reactive with the basic pigment and in an amount to form sufficient heavy metal soaps to cause substantial increase in the viscosity of the mixture, and an alcohol of low dipole moment and substantially insoluble in the mixture in an amount sufficient to peptize the soap after initial rise in the viscosity of the mixture whereby ultimately to reduce its inherent high viscosity and to eliminate livering tendency without appreciable dilution of the composition.

9. The product of claim 8, the alcohol being a primary monohydric alcohol.

10. The product of claim 8, the alcohol being present in an amount not over 5% by weight of the mixture.

11. The product of claim 8, the alcohol being present in an amount approximately 0.8% by weight of the mixture.

12. The product of claim 8, the alcohol being present in an amount approximately one-half of 1% by weight of the mixture.

SAMUEL CABOT.